US012705730B2

(12) United States Patent
Lei et al.

(10) Patent No.: US 12,705,730 B2
(45) Date of Patent: Aug. 11, 2026

(54) CHARGED PARTICLE IMAGE INSPECTION

(71) Applicant: ASML Netherlands B.V., Veldhoven (NL)

(72) Inventors: Hairong Lei, San Jose, CA (US); Wei Fang, Milpitas, CA (US); Yung Wen Fu, Hsinchu County (TW)

(73) Assignee: ASML Netherlands B.V., Veldhoven (NL)

( * ) Notice: Subject to any disclaimer, the term of this patent is extended or adjusted under 35 U.S.C. 154(b) by 326 days.

(21) Appl. No.: 18/553,041

(22) PCT Filed: Feb. 17, 2022

(86) PCT No.: PCT/EP2022/053896
§ 371 (c)(1),
(2) Date: Sep. 28, 2023

(87) PCT Pub. No.: WO2022/207181
PCT Pub. Date: Oct. 6, 2022

(65) Prior Publication Data

US 2024/0212131 A1 Jun. 27, 2024

Related U.S. Application Data

(60) Provisional application No. 63/168,199, filed on Mar. 30, 2021.

(51) Int. Cl.
*G06T 7/00* (2017.01)
*G06V 10/22* (2022.01)
*G06V 20/69* (2022.01)

(52) U.S. Cl.
CPC .............. *G06T 7/001* (2013.01); *G06V 10/22* (2022.01); *G06V 20/698* (2022.01);
(Continued)

(58) Field of Classification Search
CPC .......... G06V 10/22; G06T 2207/10061; G06T 2207/20076; G06T 2207/30148; G06T 2207/20081; G06T 2207/20084
See application file for complete search history.

(56) References Cited

U.S. PATENT DOCUMENTS 6,456,899 B1 9/2002 Gleason et al.
2007/0133860 A1 6/2007 Lin et al.
(Continued)

FOREIGN PATENT DOCUMENTS

CN 110389153 A 10/2019
WO WO 2017/180399 A1 10/2017
WO WO 2019/129569 A1 7/2019

OTHER PUBLICATIONS

PCT International Search Report and Written Opnion issued in related PCT International Application No. PCT/EP2022/053896; mailed Jul. 8, 2022 (12 pgs.).

*Primary Examiner* — Stephen R Koziol
*Assistant Examiner* — Ashley Hytrek
(74) *Attorney, Agent, or Firm* — FINNEGAN, HENDERSON, FARABOW, GARRETT & DUNNER LLP

(57) ABSTRACT

An unknown defect type cannot be identified or classified by existing defect classification techniques. An improved defect classification method includes obtaining an inspection image of a wafer resulting from a lithography process, obtaining layout data associated with the inspection image, obtaining a probability map derived from the layout data, wherein the probability map identifies a probability of a first defect type resulting from the lithography manufacturing process occurring in a region of the layout data, identifying a potential defect in the inspection image occurring at a first location, evaluating a confidence score for the potential defect, based on a threshold corresponding to a known
(Continued)

100 defect type, indicating the potential defect as an unknown defect type if the confidence score does not satisfy the threshold, and classifying the unknown defect type based on the probability map and the first location.

18 Claims, 9 Drawing Sheets

(52) U.S. Cl.
CPC ............... *G06T 2207/10061* (2013.01); *G06T 2207/20076* (2013.01); *G06T 2207/30148* (2013.01)

(56) References Cited

U.S. PATENT DOCUMENTS

2013/0279790 A1 10/2013 Kaizerman et al.
2013/0279795 A1* 10/2013 Shlain .................. G06V 10/987 382/149
2015/0154746 A1* 6/2015 Zafar .................... G06T 7/0006 382/149
2016/0180513 A1 6/2016 Park et al.
2016/0300338 A1* 10/2016 Zafar ...................... G06T 7/001
2017/0082555 A1* 3/2017 He ..................... G01N 21/9501
2019/0004504 A1 1/2019 Yati
2020/0161081 A1* 5/2020 Pathangi ................. H01J 37/28
2020/0226743 A1* 7/2020 Savchenko .......... G06V 10/774
2021/0118125 A1* 4/2021 Chen ....................... G06T 7/001
2022/0292317 A1* 9/2022 Hirai ..................... G06F 18/241

* cited by examiner 300
301
305
302
306

310
311
315
312
316

320
321
325
326

330
331
335

340
341
345

350
351
355
356

CHARGED PARTICLE IMAGE INSPECTION

CROSS-REFERENCE TO RELATED APPLICATIONS

This application claims priority to International Application No. PCT/EP2022/053896, filed Feb. 17, 2022, and published as WO 2022/207181 A1, which claims priority of U.S. application 63/168,199 which was filed on Mar. 30, 2021. The contents of these applications are incorporated herein by reference in their entireties.

TECHNICAL FIELD

The embodiments provided herein relate to charged-particle image inspection and defect classification.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important. The ability to identify and classify defects during the inspection process can significantly improve the manufacturing process.

SUMMARY

In some embodiments, a method is disclosed for defect classification comprising obtaining an inspection image, obtaining layout data associated with the image, obtaining a probability map derived from the layout data wherein the probability map identifies a probability of a first type of defect occurring in a region of the layout data, identifying a defect in the inspection image occurring at a first location, and classifying the defect based on the probability map and the first location. Embodiments also disclose a method of training a model, the method comprising obtaining layout data, obtaining an inspection image, generating a partial inspection image by removing a first portion of the inspection image, obtaining a probability map derived from the layout data wherein the probability map identifies a probability of a first type of defect occurring in a region of the layout data, and training the model to generate an expected image corresponding to the first portion of the inspection image using the probability map, the first portion of the inspection image, and the partial inspection image. Embodiments further disclose a method of generating a portion of an inspection image, the method comprising, obtaining layout data, generating a partial inspection image by removing a first portion of the inspection image, obtaining a model trained to generate portions of images, obtaining a probability map derived from the layout data wherein the probability map identifies a probability of a first type of defect occurring in a region of the layout data and generating a second portion of the inspection image, based on the partial inspection image, the probability map, and the model.

In some embodiments, a system is disclosed including a memory storing a set of instructions; and at least one processor configured to execute the set of instructions to cause the system to perform obtaining an inspection image, obtaining layout data associated with the image, obtaining a probability map derived from the layout data wherein the probability map identifies a probability of a first type of defect occurring in a region of the layout data, identifying a defect in the inspection image occurring at a first location, and classifying the defect based on the probability and the first location. In some embodiments a system is disclosed comprising a memory storing a set of instructions and at least one processor configured to execute the set of instructions to cause the system to perform obtaining layout data, obtaining an inspection image, generating a partial inspection image by removing a first portion of the inspection image, obtaining a probability map derived from the layout data wherein the probability map identifies a probability of a first type of defect occurring in a region of the layout data, and training the model to generate an expected image corresponding to the first portion of the inspection image using the probability map, the first portion of the inspection image, and the partial inspection image. Embodiments further disclose a system including a memory storing a set of instructions; and at least one processor configured to execute the set of instructions to cause the system to perform generating a partial inspection image by removing a first portion of the inspection image, obtaining a model trained to generate portions of images, obtaining a probability map derived from the layout data wherein the probability map identifies a probability of a first type of defect occurring in a region of the layout data and generating a second portion of the inspection image, based on the partial inspection image, the probability map, and the model.

In some embodiments a non-transitory computer readable medium is disclosed that stores a set of instructions that is executable by at least one processor of a computing device to cause the computing device to perform a method of defect classification, the method comprising, obtaining an inspection image, obtaining layout data associated with the image, obtaining a probability map derived from the layout data wherein the probability map identifies a probability of a first type of defect occurring in a region of the layout data, identifying a defect in the inspection image occurring at a first location and classifying the defect based on the probability map and the first location. Embodiments also disclose a non-transitory computer readable medium is disclosed that stores a set of instructions that is executable by at least one processor of a computing device to cause the computing device to perform a method of defect classification, the method comprising obtaining layout data, obtaining an inspection image, generating a partial inspection image by removing a first portion of the inspection image, obtaining a probability map derived from the layout data wherein the probability map identifies a probability of a first type of defect occurring in a region of the layout data, and training the model to generate an expected image corresponding to the first portion of the inspection image using the probability map, the first portion of the inspection image, and the partial inspection image. In some embodiments a non-transitory computer readable medium is disclosed that stores a set of instructions that is executable by at least one processor of a computing device to cause the computing device to perform a method of defect classification, the method comprising, generating a partial inspection image by removing a first portion of the inspection image, obtaining a model trained to generate portions of images, obtaining a probability map derived from the layout data wherein the probability map identifies a probability of a first type of defect occurring in a region of the layout data and generating a second portion of the inspection image, based on the partial inspection image, the probability map, and the model.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Figure 1:
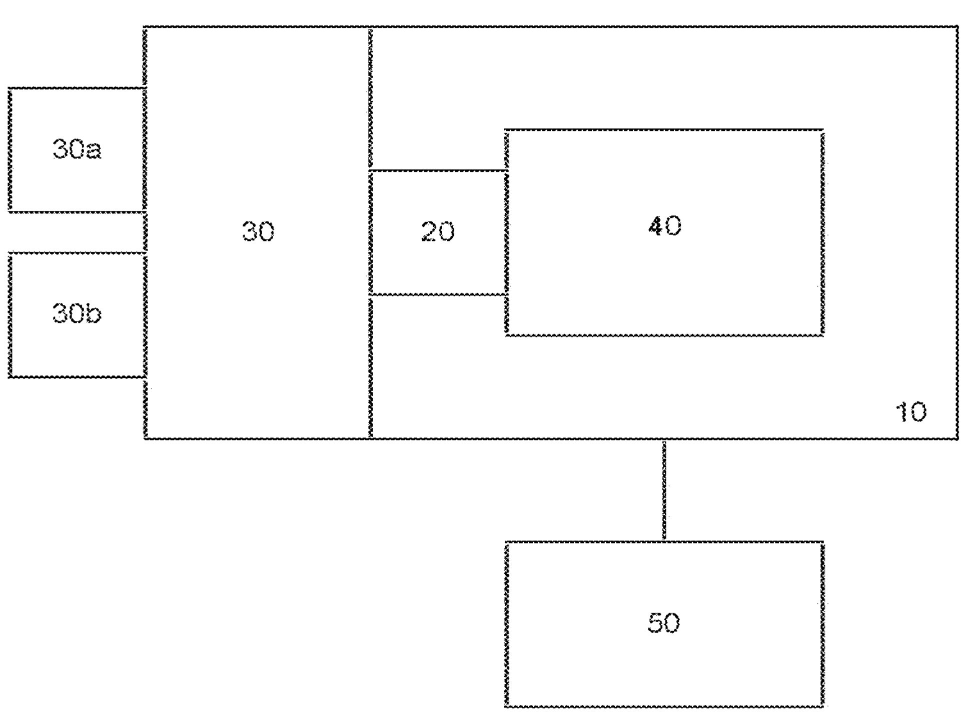
FIG. 1 is a schematic diagram illustrating an exemplary electron beam inspection (EBI) system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Additionally, various embodiments directed to an inspection process disclosed herein are not intended to limit the disclosure. The embodiments disclosed herein are applicable to any technology involving defect classification, automated defect classification, or other classification or layout optimization systems and are not limited to, inspection and lithography systems.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process; that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using, e.g., a scanning electron microscope (SEM). A SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

In modern semiconductor manufacturing processes, there are many methods and processes that can aid in reducing defects. These methods can be implemented at various stages throughout the design phase and early manufacturing phases to prevent defects before they occur. In order to properly account for defects, it is important to properly identify or classify defects, which can be performed by examining inspection images such as SEM images. However, it can be difficult to identify and classify a new or previously unknown type of defects because currently available defect identification or classification techniques are typically based on comparison with known or previously identified defect types or defect images. Further, a manual comparison and match determination process is heavily involved in identifying or classifying detects by current techniques. Therefore, improvements in identifying or classifying defects on inspection images are desired.

According to embodiments of the present disclosure, defect classification can be improved by using models that can automatically identify or classify a defect(s) on an inspection image. According to some embodiments of the present disclosure, a defect that cannot be properly identified or classified as a defect or as a certain detect type by existing techniques can also be automatically identified or classified as a defect or as a certain defect type. These embodiments can generate a probability map that can segment a layout file into different regions (for example, as shown in FIG. 5) based on the likelihood that certain types of defects will occur in each of the regions. Additionally, the embodiments can train a model that can generate the expected inspection image of a layout file. Using this model, portions of the inspection images that have defects can be replaced with reference images of what the inspection image is expected to look like. The reference image can then be compared to different inspection images during the manufacturing process, and, using the layout probability map, a neural network can identify the probability that defects found in the sample image correspond to known defects. Thereby, a potential defect on an inspection image can be properly classified as a certain detect type or a defect based on a probability map and a location of the potential defect. If the probability is below a certain threshold, the defect can be classified as a new defect. After a defect is classified as a new defect, the designers or operators of the lithography system can determine how to account for or correct the defect.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference is now made to FIG. 1, which illustrates an example electron beam inspection (EBI) system 100 consistent with embodiments of the present disclosure. As described below, the inspection system can generate pattern data. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30*a* and a second loading port 30*b*. EFEM 30 may include additional loading port(s). First loading port 30*a* and second loading port 30*b* receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool. In other embodiments, electron beam tool 40 may comprise a multi-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
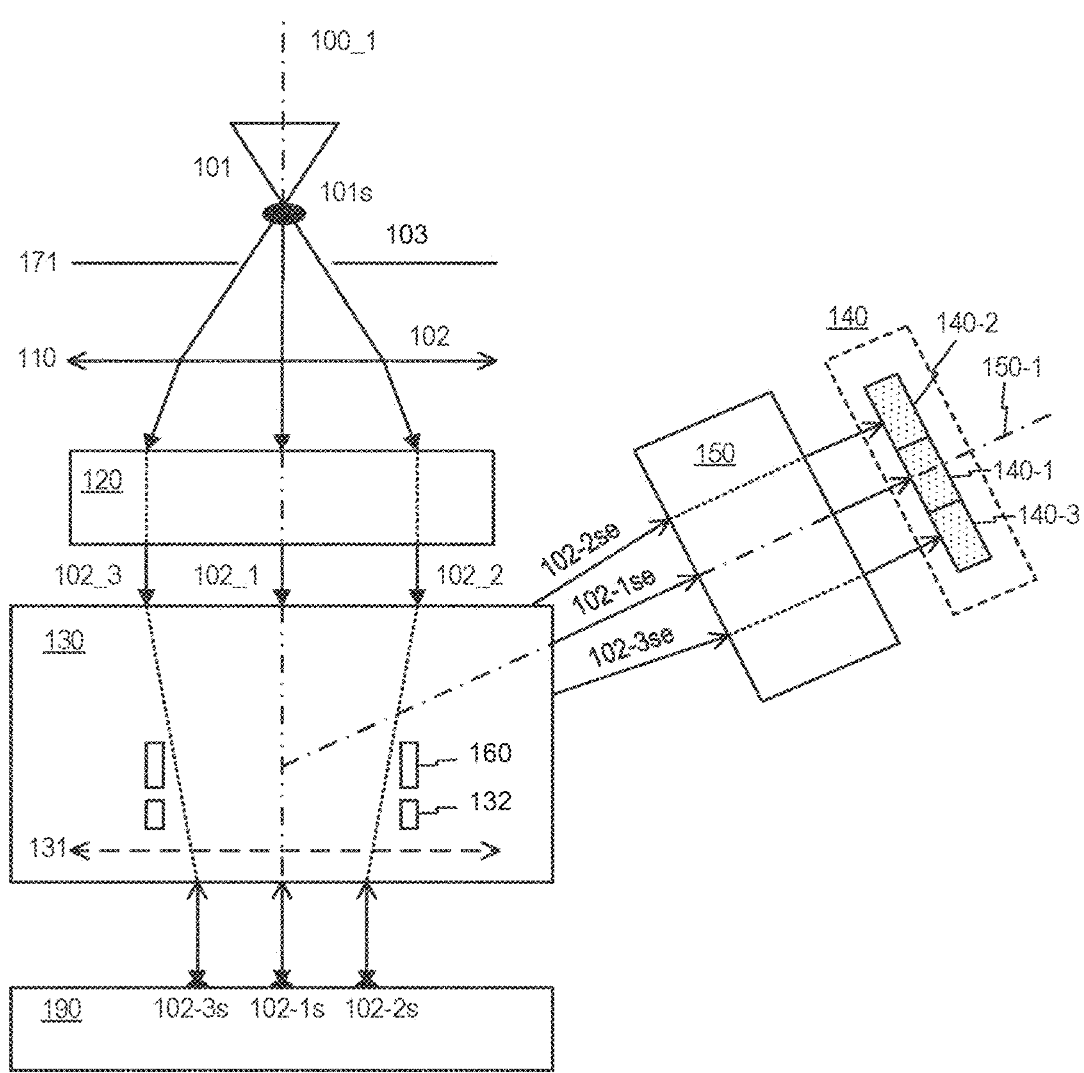
FIG. 2 is a schematic diagram illustrating an exemplary electron beam tool that can be a part of the exemplary electron beam inspection system of FIG. 1, consistent with embodiments of the present disclosure.

Reference is now made to FIG. 2, which illustrates a schematic diagram illustrating an exemplary electron beam tool or, in some embodiments, an electron-beam tool, that can be a part of the exemplary electron beam inspection system 1 of FIG. 1, consistent with embodiments of the present disclosure. Electron beam tool 100 (also referred to herein as apparatus 100) comprises an electron beam source 101, a gun aperture plate 171 with a gun aperture 103, a condenser lens 110, a source conversion unit 120, a primary projection optical system 130, a sample stage (not shown in FIG. 2), a secondary optical system 150, and an electron detection device 140. Primary projection optical system 130 can comprise an objective lens 131. Electron detection device 140 can comprise a plurality of detection elements 140_1, 140_2, and 140_3. Beam separator 160 and deflection scanning unit 132 can be placed inside primary projection optical system 130. It may be appreciated that other commonly known components of apparatus 100 may be added/omitted as appropriate.

Electron source 101, gun aperture plate 171, condenser lens 110, source conversion unit 120, beam separator 160, deflection scanning unit 132, and primary projection optical system 130 can be aligned with a primary optical axis 100_1 of apparatus 100. Secondary optical system 150 and electron detection device 140 can be aligned with a secondary optical axis 150_1 of apparatus 100.

Electron source 101 can comprise a cathode, an extractor or an anode, wherein primary electrons can be emitted from the cathode and extracted or accelerated to form a primary electron beam 102 that forms a crossover (virtual or real) 101*s*. Primary electron beam 102 can be visualized as being emitted from crossover 101*s*.

Source conversion unit 120 can comprise an image-forming element array (not shown in FIG. 2). The image-forming element array can comprise a plurality of micro-deflectors or micro-lenses to form a plurality of parallel images (virtual or real) of crossover 101*s* with a plurality of beamlets of primary electron beam 102. FIG. 2 shows three beamlets 102_1, 102_2, and 102_3 as an example, and it is appreciated that the source conversion unit 120 can handle any number of beamlets. Controller 50 of FIG. 1 may be connected to various parts of charged particle beam inspection system 100 of FIG. 1, such as source conversion unit 120, electron detection device 140, primary projection optical system 130, or a motorized stage (not shown). In some embodiments, as explained in further details below, controller 50 may perform various image and signal processing functions. Controller 50 may also generate various control signals to govern operations of the charged particle beam inspection system.

Condenser lens 110 can focus primary electron beam 102. The electric currents of beamlets 102_1, 102_2, and 102_3 downstream of source conversion unit 120 can be varied by adjusting the focusing power of condenser lens 110 or by changing the radial sizes of the corresponding beam-limit apertures within the beam-limit aperture array. Objective lens 131 can focus beamlets 102_1, 102_2, and 102_3 onto a sample 190 for inspection and can form three probe spots 102_1*s*, 102_2*s*, and 102_3*s* on surface of sample 190. Gun aperture plate 171 can block off peripheral electrons of primary electron beam 102 not in use to reduce Coulomb effect. The Coulomb effect can enlarge the size of each of probe spots 102_1*s*, 102_2*s*, and 102_3*s*, and therefore deteriorate inspection resolution.

Beam separator 160 can be a beam separator of Wien filter type comprising an electrostatic deflector generating an electrostatic dipole field E1 and a magnetic dipole field B1 (both of which are not shown in FIG. 2). If they are applied, the force exerted by electrostatic dipole field E1 on an electron of beamlets 102_1, 102_2, and 102_3 is equal in magnitude and opposite in direction to the force exerted on the electron by magnetic dipole field B1. Beamlets 102_1, 102_2, and 102_3 can therefore pass straight through beam separator 160 with zero deflection angles.

Deflection scanning unit 132 can deflect beamlets 102_1, 102_2, and 102_3 to scan probe spots 102_1*s*, 102_2*s*, and 102_3*s* over three small scanned areas in a section of the surface of sample 190. In response to incidence of beamlets 102_1, 102_2, and 102_3 at probe spots 102_1*s*, 102_2*s*, and 102_3*s*, three secondary electron beams 102_1*se*, 102_2*se*, and 102_3*se* can be emitted from sample 190. Each of secondary electron beams 102_1*se*, 102_2*se*, and 102_3*se* can comprise electron beams with a distribution of energies including secondary electrons (energies≤50 eV), and backscattered electrons (energies between 50 eV and landing energies of beamlets 102_1, 102_2, and 102_3). Beam separator 160 can direct secondary charged-particle beams 102_1*se*, 102_2*se*, and 102_3*se* towards secondary optical system 150. Secondary optical system 150 can focus secondary electron beams 102_1*se*, 102_2*se*, and 102_3*se* onto detection elements 140_1, 140_2, and 140_3 of electron detection device 140. Detection elements 140_1, 140_2, and 140_3 can detect corresponding secondary electron beams 102_1*se*, 102_2*se*, and 102_3*se* and generate corresponding signals, which are sent to controller 50 or a signal processing system (not shown), e.g., to construct images of the corresponding scanned areas of sample 190.

In some embodiments, detection elements 140_1, 140_2, and 140_3 detect corresponding secondary electron beams 102_1*se*, 102_2*se*, and 102_3*se*, respectively, and generate corresponding intensity signal outputs (not shown) to an image processing system (e.g., controller 50). In some embodiments, each detection element 140_1, 140_2, and 140_3 may comprise one or more pixels. The intensity signal output of a detection element may be a sum of signals generated by all the pixels within the detection element.

In some embodiments, controller 50 may comprise image processing system that includes an image acquirer (not shown), a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 140 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 140 and may construct an image. The image acquirer may thus acquire images of sample 190. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on an imaging signal received from electron detection device 140. An imaging signal may correspond to a scanning operation for conducting charged particle imaging. An acquired image may be a single image comprising a plurality of imaging areas. The single image may be stored in the storage. The single image may be an original image that may be divided into a plurality of regions. Each of the regions may comprise one imaging area containing a feature of sample 190. The acquired images may comprise multiple images of a single imaging area of sample 190 sampled multiple times over a time sequence. The multiple images may be stored in the storage. In some embodiments, controller 50 may be configured to perform image processing steps with the multiple images of the same location of sample 190.

In some embodiments, controller 50 may include measurement circuitries (e.g., analog-to-digital converters) to obtain a distribution of the detected secondary electrons. The electron distribution data collected during a detection time window, in combination with corresponding scan path data of primary electron beam 102 incident on the wafer surface, can be used to reconstruct images of the wafer structures under inspection. The reconstructed images can be used to reveal various features of the internal or external structures of sample 190, and thereby can be used to reveal any defects that may exist in the wafer.

FIGS. 3A-3F are block diagrams of exemplary defects, consistent with embodiments of the present disclosure. Defect diagrams 300, 310, 320, 330, 340, and 350 can represent defects that occur on a wafer during manufacturing. Each of defect diagrams 300, 310, 320, 330, 340, and 350 is discussed in more detail below and can represent a defect that can occur for different types of structures on a wafer. Defects demonstrated in defect diagrams 300, 310, 320, 330, 340 and 350 can be referred to as known defects that, for example, can occur when using the structures depicted. Because these are known defects, designers can account for the possible occurrence of these defects when designing a layout. Defect diagrams 300, 310, 320, 330, 340, and 350 include structures representing information that can be stored in a layout file for a wafer design.

The layout file can be in a Graphic Database System (GDS) format, Graphic Database System II (GDS II) format, an Open Artwork System Interchange Standard (OASIS) format, a Caltech Intermediate Format (CIF), etc. The wafer design may include patterns or structures for inclusion on the wafer. The patterns or structures can be mask patterns used to transfer features from the photolithography masks or reticles to a wafer. In some embodiments, a layout in GDS or OASIS format, among others, may comprise feature information stored in a binary file format representing planar geometric shapes, text, and other information related to the wafer design.

Figures 3A, 3B, 3C, 3D, 3E, 3F:
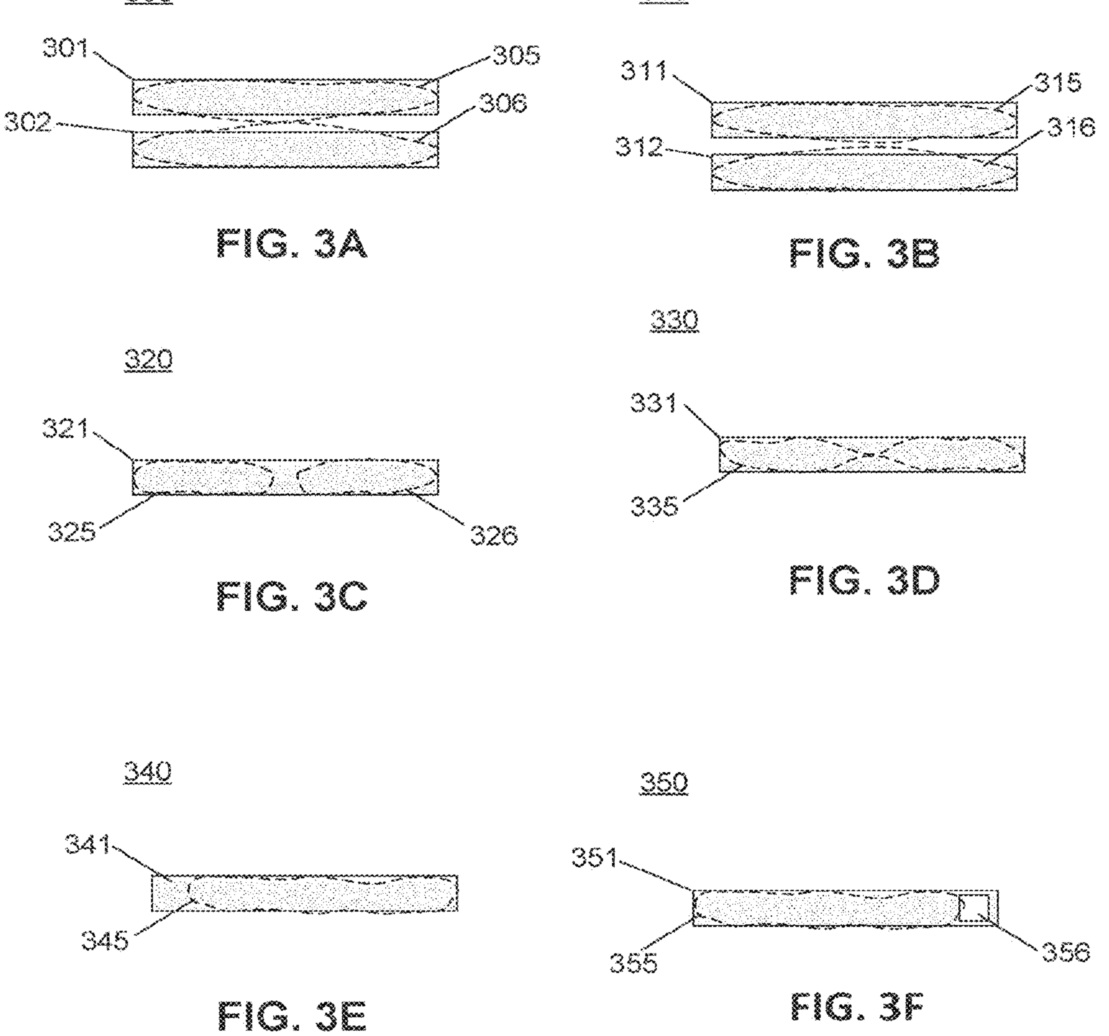
FIGS. 3A-3F are block diagram of exemplary defects, consistent with embodiments of the present disclosure.

FIG. 3A is a block diagram of an exemplary defect diagram 300 representing a hard-bridge, or short, defect. Layout structures 301 and 302 can represent structures that are part of a design layout stored in, for example, a GDS file. Structures 305 and 306 can represent structures that are deposited on the wafer during the manufacturing process. As shown in FIG. 3A, the boundaries of structures 305 and 306 can deviate from the exact dimensions in the GDS layout file (e.g., layout structures 301 and 302). In defect diagram 300, the sides of structures 305 and 306 can intersect creating a point of contact. This point of contact can, for example, create a hard-bridge or a short between structures 305 and 306 on the wafer.

FIG. 3B is a block diagram of an exemplary defect diagram 310 representing a soft-bridge, or near short, defect. Layout structures 311 and 312 can represent structures that are part of a design layout stored in, for example, a GDS file. Structures 315 and 316 can represent structures that are deposited on the wafer during the manufacturing process. As shown in FIG. 3B, the boundaries of structures 315 and 316 can deviate from the exact dimensions in the GDS layout file (e.g., layout structures 311 and 312). In defect diagram 310, the sides of structures 315 and 316 can almost be intersecting. This proximity can, for example, create a soft-bridge or a near-short between structures 315 and 316 on the wafer resulting in the defect.

FIG. 3C is a block diagram of an exemplary defect diagram 320 representing a hard-break, or open, defect. Layout structure 321 can represent a structure that is part of a design layout stored in, for example, a GDS file. Structures 325 and 326 can represent parts of a structure that are deposited on the wafer during the manufacturing process. As shown in FIG. 3C, the boundaries of structures 325 and 326 can deviate from the exact dimensions in the GDS layout file (e.g., layout structure 321). In defect diagram 320, the structures 325 and 326 which can represent parts of layout structure 321, can be split from each other to form two structures instead of one congruous structure. The opening between the structures (e.g., structures 325 and 326) can create an open or hard-break defect.

FIG. 3D is a block diagram of an exemplary defect diagram 330 representing a soft-break, or strong-pinching, defect. Layout structure 331 can represent a structure that is part of a design layout stored in, for example, a GDS file. Structure 335 can represent a structure that is deposited on the wafer during the manufacturing process. As shown in FIG. 3D, the boundaries of structure 335 can deviate from the exact dimensions in the GDS layout file (e.g., layout structure 331). In defect diagram 330, structure 335, which can represent layout structure 331, can include a thin portion in the middle of the structure. In this example, the thin portion of structure 335 can create a soft-break or strong-pinching defect.

FIG. 3E is a block diagram of an exemplary defect diagram 340 representing a line-end pullback, defect. Layout structure 341 can represent a structure that is part of a design layout stored in, for example, a GDS file. Structure 345 can represent a structure that is deposited on the wafer during the manufacturing process. As shown in FIG. 3E, the boundaries of structure 345 can deviate from the exact dimensions in the GDS layout file (e.g., layout structure 341). In defect diagram 340, structure 345, which can represent layout structure 341, can include an empty portion at the end of the structure. In this example, the missing end portion of structure 345 can result in a line-end pullback defect.

FIG. 3F is a block diagram of an exemplary defect diagram 350 representing an exposed via defect. Layout structure 351 can represent a structure that is part of a design layout stored in, for example, a GDS file. Structure 355 can represent a structure that is deposited on the wafer during the manufacturing process. As shown in FIG. 3F, the boundaries of structure 355 can deviate from the exact dimensions in the GDS layout file (e.g., layout structure 351). In defect diagram 350, structure 355, which can be intended to be layout structure 351, can include an empty portion at the end of the structure. In some embodiments, the missing structure can result in an exposed via 356 resulting in a defect.

Figure 4:
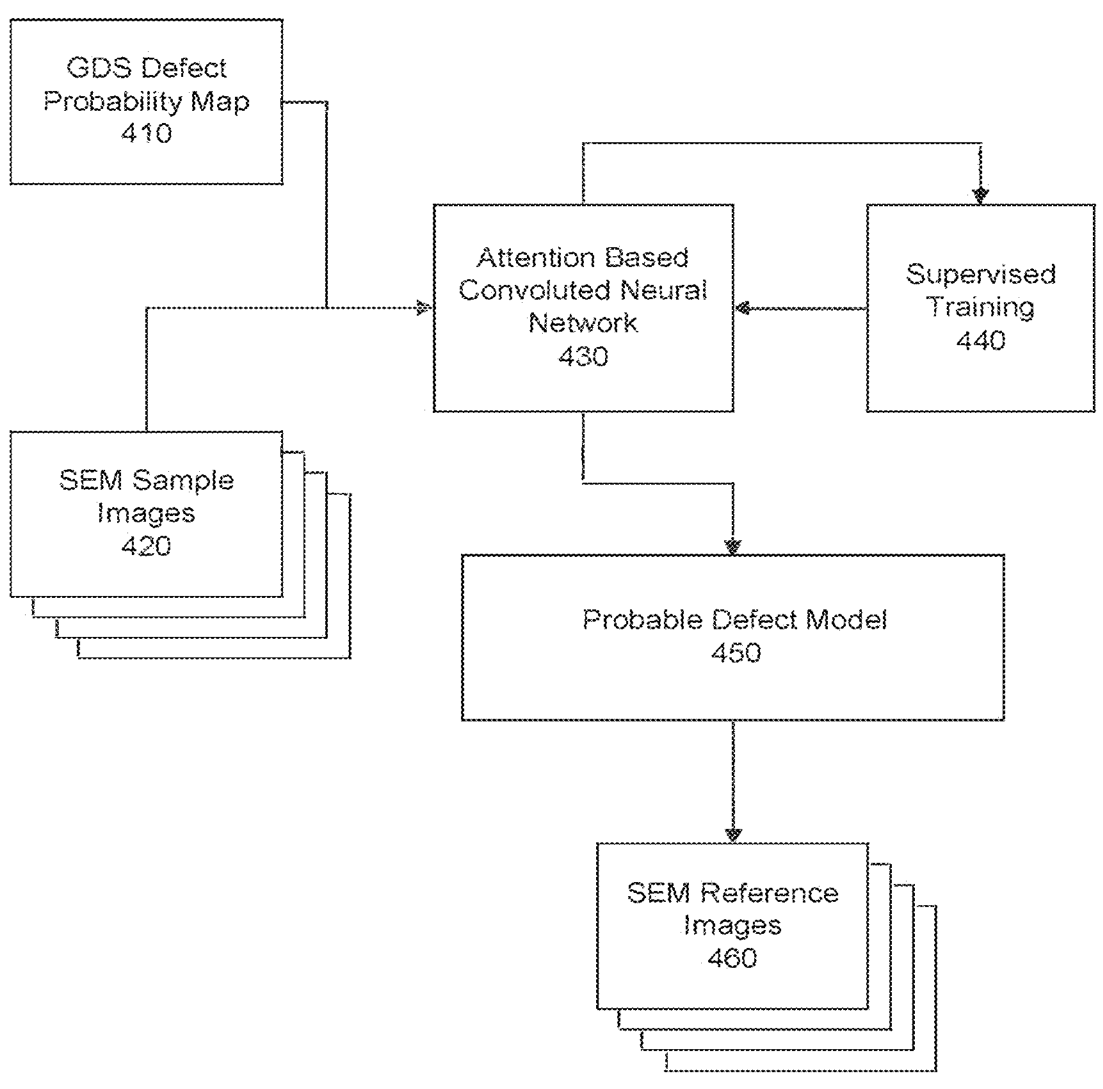
FIG. 4 is a block diagram of an exemplary training system for defect classification, consistent with embodiments of the present disclosure.

FIG. 4 is a block diagram of an exemplary training system 400 for defect classification, consistent with embodiments of the present disclosure. It is appreciated that in various embodiments, training system 400 may be part of or may be separate from a charged-particle beam inspection system (e.g., electron beam inspection system 100 of FIG. 1), or computational lithography system, or other photolithography systems. In some embodiments, training system 400 may be part of, for example, controller 50 or part of other modules of FIGS. 1 and 2.

In some embodiments, training system 400 can include GDS Defect probability map 410, SEM sample images 420, attention based convoluted neural network 430, supervised training 440, probable defect model 450, and SEM reference images 460.

According to some embodiments, training system 400 can include GDS defect probability map 410 and SEM sample images 420 as input. GDS defect probability map can include a probability map generated based on a GDS file associated with a layout. For example, GDS defect probability map can be defect probability map 500 shown in FIG. 5A.

Figure 5A:
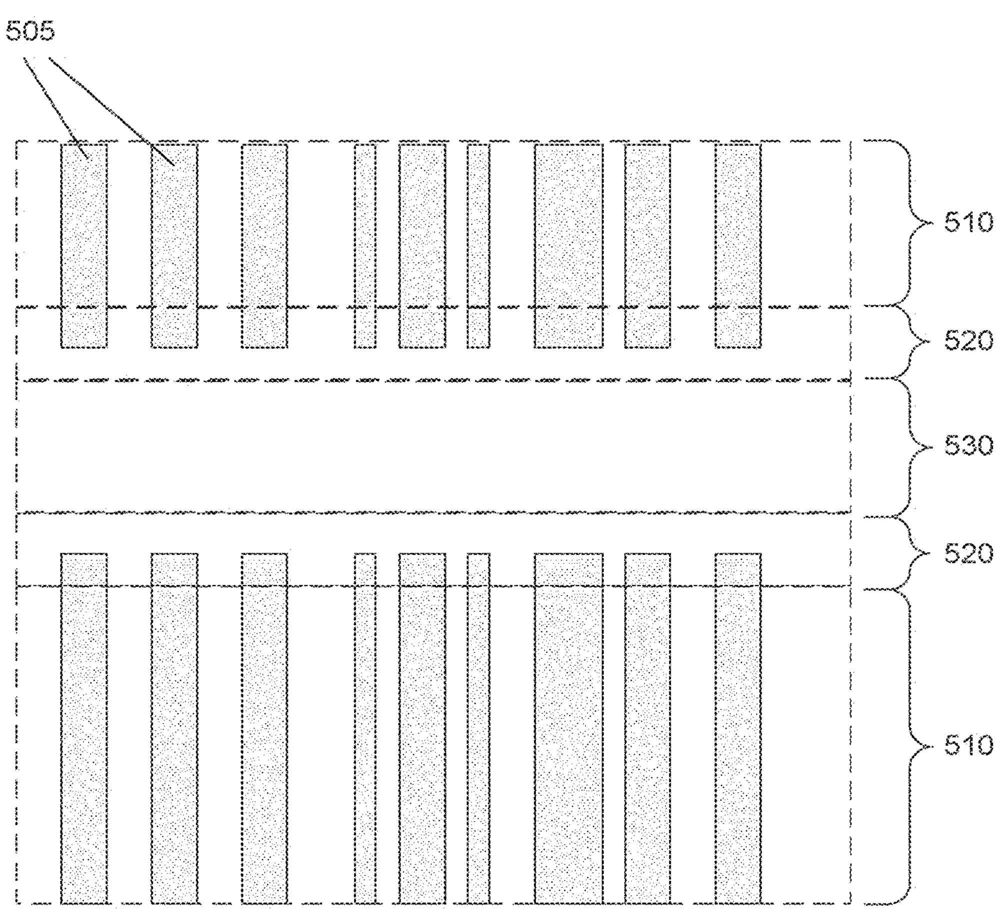
FIG. 5A is an exemplary diagram of a defect probability map, consistent with embodiments of the present disclosure.

Referring to FIG. 5A, FIG. 5A is an exemplary diagram of defect probability map 500, consistent with embodiments of the present disclosure. Defect probability map 500 can include a layout stored in, for example, a GDS file. The layout can include design structures 505. It is appreciated that additional design structures other than what is shown in FIG. 5A can be included in the layout.

According to embodiments of the disclosure, the GDS layout can be separated into different probability regions. For example, the GDS layout in FIG. 5A can be divided into probability regions 510, 520, and 530. In some embodiments, portions of the probability regions can overlap. The probability regions can indicate areas of the GDS file that are likely to result in known defects. In some embodiments, the known defects that are expected to occur in a region are specific to the region. For example, the probability of a hard-break or soft-break defect can be higher in region 510 than other types of defects and the probability of an exposed via or line-end pullback defect can be higher in region 520. As another example, region 530 can include a higher probability of a particle defect than other regions of the GDS file.

In some embodiments the regions of GDS probability map 500 can be determined manually. In other embodiments, the regions of GDS probability map 500 may be determined by an automated process. In yet another embodiment, a combination of automated and manual process can determine the regions (e.g., regions 510, 520, and 530) of probability map 500. If the GDS layout file is modified, probability map 500 can be updated to account for changes in the GDS layout.

Referring back to FIG. 4, training system 400 can also obtain SEM sample images 420. SEM sample images 420 can include images obtained from a SEM. The images can correspond to the GDS layout used to generate GDS defect probability map 410. Training system 400 can use one or multiple SEM sample images 420.

GDS defect probability map 410 and SEM sample images 420 can be provided to a machine learning system or neural network such as attention based convoluted neural network ("ABCNN") 430.

It is appreciated by one of ordinary skill in the art that other types of machine learning systems can be utilized. For example, ABCNN 430 can be a convoluted neural network, an artificial neural network, or a recurrent neural network. The specific choice of neural network can be based on the specific features of defect map 410 and SEM sample images 420.

ABCNN 430 can receive and process GDS defect probability map 410 and SEM sample images 420. In some embodiments, a sample image 420 provided to ABCNN 430 can have a portion of the image removed. ABCNN 430 can process the sample image and predict the missing portion of SEM sample image 420. In doing so, defects in the SEM sample images can be removed and replaced by the calculated portion of the sample image. ABCNN 430 is described in more detail in references to FIG. 5B.

Figure 5B:
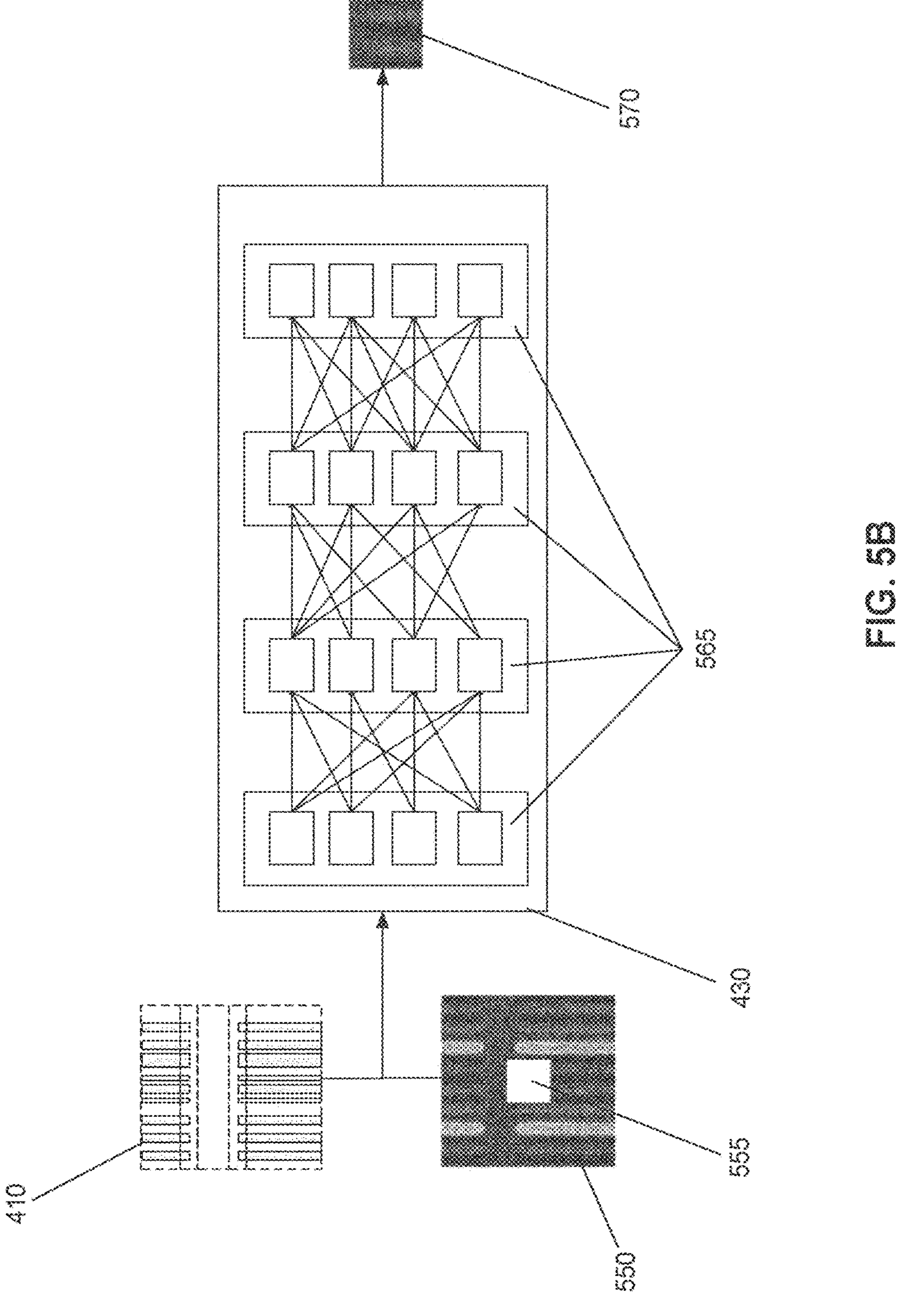
FIG. 5B is an exemplary block diagram of a neural network for use in the training system of FIG. 4, consistent with embodiments of the present disclosure.

Referring to FIG. 5B, FIG. 5B is an exemplary block diagram of ABCNN 430 of FIG. 4 for use in the training system 400, consistent with embodiments of the present disclosure. Other components shown in FIG. 5B can refer to the same numbered components as those shown in FIG. 4. As shown in FIG. 5B, ABCNN 430 can accept GDS defect probability map 410 as input. SEM sample image 550 can be one of SEM sample images 420. SEM sample image 550 can have portion 555 removed from the image. SEM sample image 550, with portion 555 removed, can be provided to ABCNN 430 as input.

ABCNN 430 can include processing layers 565, which can include a plurality of neurons. As shown, various neurons in layers 565 can be connected to allow a transfer of information between the layers and neurons. Processing layers 565 can process the pixels in sample image 550 and information in GDS defect probability map 410 to output pixel map 570 representing the expected portion 555 of sample image 550. As ABCNN 430 is trained with additional sample images 550, the accuracy of pixel map 570 can improve.

Referring back to FIG. 4, the output of ABCNN 430 can be provided to supervised training 440. Through a supervised training process, the accuracy of ABCNN 430 can be fine tuned to ensure that accurate predictions of the missing portions of SEM image samples 420 are calculated. Supervised training 440 can utilize the removed portion of the sample image as a ground truth reference for improving the accuracy of the training.

After training system trains ABCNN 430 using supervised training 440, training system can output a probable defect model 450. Probable defect model 450 can calculate the missing portions of SEM sample images 420 and insert the missing portion in the sample image to generate SEM reference images 460. The resulting SEM reference images 460 can be free of any defects and represent the expected SEM image resulting from the corresponding GDS layout.

Figure 6:
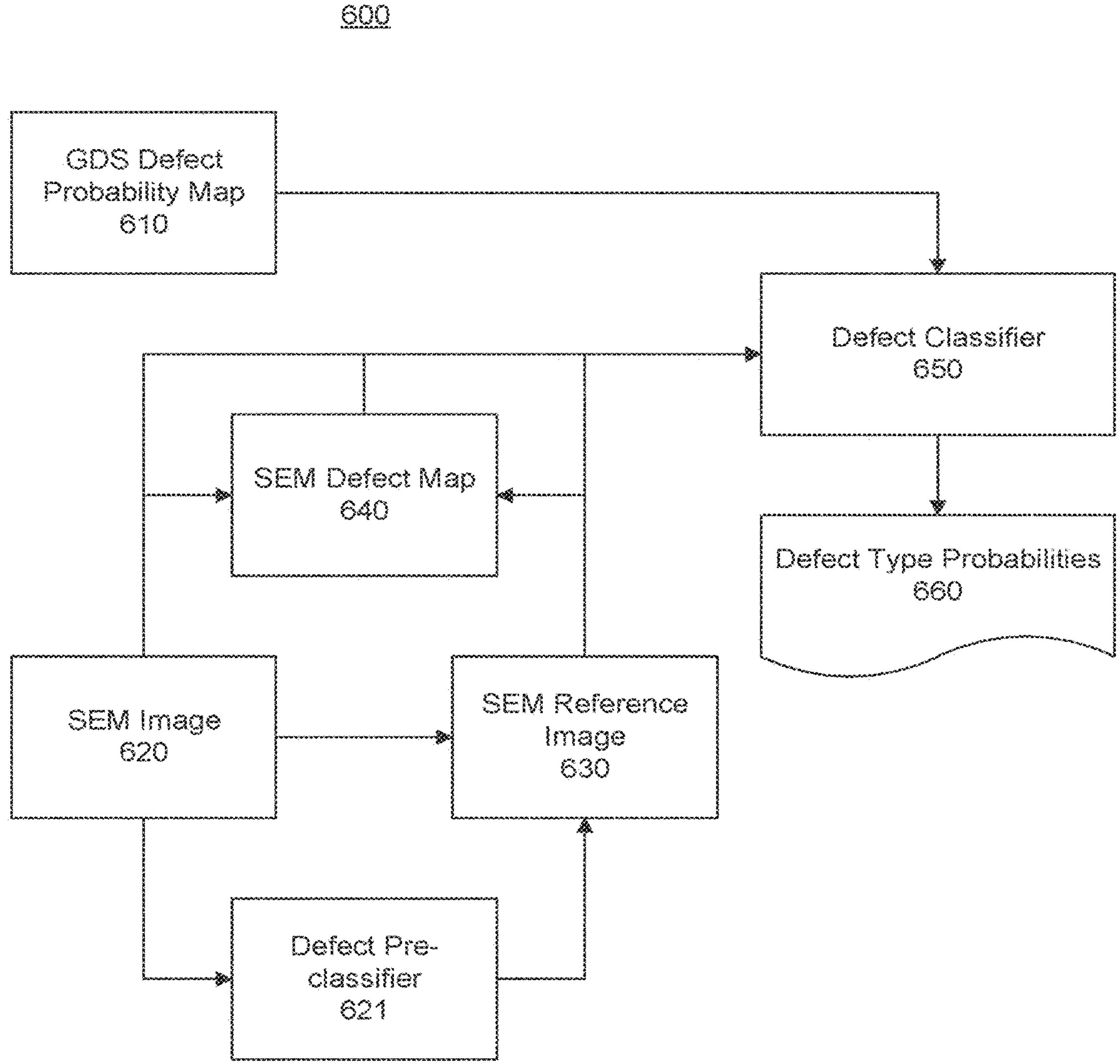
FIG. 6 is a block diagram of an exemplary defect classification system, consistent with embodiments of the present disclosure.

FIG. 6 is a block diagram of an exemplary defect classification system 600, consistent with embodiments of the present disclosure. It is appreciated that in various embodiments, defect classification system 600 may be part of or may be separate from a charged-particle beam inspection system (e.g., electron beam inspection system 100 of FIG. 1), or computational lithography system, or other photolithography systems.

In some embodiments, defect classification system 600 can include GDS defect probability map 610, SEM image 620, SEM reference image 630, SEM defect map 640, defect classifier 650, and can output defect type probabilities 660.

According to some embodiments, defect classification system 600 can include GDS defect probability map 610. Defect probability map 610 can be the same defect probability map used in training system 400 described in FIG. 4 and defect probability map 500 described in FIG. 5. Defect probability map 610 can represent the probability that different regions in a GDS layout file contain specific types of defects.

As additional input, defect classification system 600 can include SEM image 620. SEM image 620 can be an SEM image captured by, for example, inspection system 100 of FIG. 1. SEM image 620 can be an inspection image of a semiconductor device, such as a semiconductor device that is manufactured based on the GDS layout used to generate the GDS defect probability map 610.

In some embodiments, defect classification system 600 can further include a defect pre-classifier 621. In some embodiments, defect pre-classifier 621 may be configured to identify or categorize a potential defect(s) on SEM image 620 without using GDS defect probability map 610. Defect pre-classifier 621 may identify or classify a potential defect(s) on SEM image 620 using existing defect identification or classification techniques. In some embodiments, defect pre-classifier 621 may identify a potential defect(s) by comparing SEM image 620 to reference data. The reference data can be another SEM image of a sample corresponding to SEM image 620, a layout file of a sample corresponding to SEM image 620, etc. In some embodiments, a potential defect(s) can be identified with a location of the potential defect(s) on SEM image 620. In some embodiments, defect pre-classifier 621 can determine a defect type of a potential defect(s). In some embodiments, defect pre-classifier 621 can classify the potential defect(s) by defect type by comparing the potential defect(s) to preidentified or known defects, for example, kept in a library. A library may have various preidentified or known defect images that have been categorized according to predefined defect types. For example, a library may have a plurality of defect types (e.g., hard-bridge defect, soft-bridge defect, etc.) and each defect type may comprise various defect images that are preidentified as belonging to the defect type. In some embodiments, when defect pre-classifier 621 finds a match between a potential defect and a preidentified defect image in a library, the potential defect can be classified as a defect type to which the matching preidentified defect image belongs.

In some embodiments, defect pre-classifier 621 may not be able to identify a potential defect(s) as a defect with sufficient confidence. Similarly, defect pre-classifier 621 may not be able to classify a potential defect(s) as a certain defect type with sufficient confidence. In some embodiments, defect pre-classifier 621 may generate a confidence score for each potential defect. The confidence score may indicate a degree of confidence that an identified potential defect is a defect or that an identified potential defect is a certain defect type. In some embodiments, if the confidence score for a potential defect is lower than a threshold, it can be determined that the potential defect is not properly classified as a defect or as a certain defect type. For example, defect pre-classifier 621 may identify a plurality of potential defects on SEM image 620 but may classify 90% of the plurality of potential defects as a defect or as a certain defect type with sufficient confidence (e.g., confidence score being equal to or greater than a threshold). In this example, defect pre-classifier 621 may not be able to classify 10% of the plurality of potential defects with sufficient confidence on SEM image 620. It will be appreciated that a potential defect(s) that is not classified as a defect or as a certain defect type with sufficient confidence by defect pre-classifier 621 can be referred to as an unknown defect. In some embodiments, only a potential defect that is identified as an unknown defect(s) by defect pre-classifier 621 may be classified by defect classifier 650, which will be described below. Therefore, in the example above, only 10% of identified potential defects on SEM image 620 may be classified by defect classifier 650. Thereby, in some embodiments, defect classification by defect classifier 650, which may be compute intensive, may be used for a limited number of potential defects. According to some embodiments, defect classification system 600 may skip pre-classification by defect pre-classifier 621.

Defect classification system 600 can also use SEM reference image 630 as input. SEM reference image 630 can be obtained from the output of training system 400. SEM reference image 630 can represent an expected inspection image that would be captured by, for example, inspection system 100 for the semiconductor device that is manufactured based on the GDS layout file used to generate GDS defect probability map 610.

In some embodiments where pre-classification is performed by defect pre-classifier 621, SEM reference image 630 can be generated by removing only a portion(s) (e.g., portion 555 in FIG. 5B) corresponding to an unknown defect(s) that is not classified as a defect or as a certain defect type with sufficient confidence by defect pre-classifier 621. For example, when 10 unknown defects are identified by defect pre-classifier 621, SEM reference image 630 can be generated by removing 10 portions (e.g., portion 555) at the locations corresponding to the 10 unknown defects one by one and by generating corresponding 10 pixel maps (e.g., pixel map 570) corresponding to the removed 10 portions on SEM image 620. In some embodiments where pre-classification by defect pre-classifier 621 is skipped, SEM reference image 630 can be generated by repeating a process of removing a portion (e.g., portion 555) and generating a pixel map (e.g., pixel map 570) for a whole frame of SEM image 620. In these embodiments, because pre-classification by defect pre-classifier 621 is not performed, potential defects or locations of potential defects are not identified yet. Therefore, a process of removing a portion (e.g., portion 555) and generating a pixel map (e.g., pixel map 570) can be repeated for a whole frame of SEM image 620 to identify a potential defect location(s) on SEM image 620. For example, SEM image 620 may be partitioned into a plurality of portions each of which may correspond to portion 555 of FIG. 5B and a process of removing a portion (e.g., portion 555) and generating a pixel map (e.g., pixel map 570) can be repeated for each of the plurality of portions on SEM image 620 to generate SEM reference image 630.

Defect classification system 600 can calculate the difference between SEM reference image 630 and the portion of SEM image 620 that corresponds to SEM reference image 630 to generate SEM defect map 640. Because SEM image 620 is captured from a wafer during the manufacturing process and SEM reference image 630 is an expected image, the difference between the two images can show any potential defects introduced during the manufacturing process. These potential defects can then be used by the remaining components of defect classification system 600. In some embodiments where pre-classification is performed by defect pre-classifier 621, SEM defect map 640 may show only an unknown defect(s) that is not classified as a defect or as a certain defect type with sufficient confidence by defect pre-classifier 621.

Defect classifier 650 can use GDS probability map 610, SEM image 620, SEM reference image 630 and SEM defect map 640 as input. Defect classifier 650 can be a machine learning model trained using supervised, semi-supervised, or unsupervised machine learning. Defect classifier 650 can be trained to identify known or expected defects in the GDS layout file such as, for example, defects 300, 310, 320, 330, 340, or 350 of FIG. 3. Using defect probability map 610, defect classifier 650 can be trained to expect certain types of defects (e.g., one or more of defects 300, 310, 320, 330, 340, or 350) in different areas of SEM image 620. For example, defect classifier 650 can expect that defects 340 and 350, a line end pullback and exposed via, respectively, of FIG. 3, are more likely to occur in regions 520 of GDS probability map 500 of FIG. 5A.

Using the various input data, defect classifier 650 can classify a potential defect represented in SEM defect map 640 as a certain defect type expected for the particular region of the layout being inspected. In some embodiments, defect classifier 650 can classify a potential defect represented in SEM defect map 640 as a certain defect type based on a location of the potential defect on SEM defect map 640 (i.e., a location on SEM image 620) and GDS probability map 610. For example, when a potential defect is located in region 510 in FIG. 5A, the potential defect can be classified as a break defect (e.g., hard-break or soft-break) according to GDS probability map 610. Similarly, when a potential defect is located in region 530, the potential defect can be classified as a particle defect according to GDS probability map 610. According to some embodiments, even an unknown defect that is not classified as a defect or as a certain defect type with sufficient confidence by defect pre-classifier 621 can be classified as a certain defect type based on a location of a potential defect on SEM image 620 and GDS probability map 610.

In some embodiments, defect classifier 650 can output a probability that the potential defect in SEM defect map 640 is a certain defect type for that particular region (e.g., region 510, 520, or 530 of GDS probability map 610). In some embodiments, if the probability is above a certain threshold, the classification that the potential defect in SEM defect map 640 is a certain defect type can be maintained. If the probability is below a certain threshold, the potential defect in SEM defect map 640 can be classified as a new defect. The various probabilities can be output as defect type probabilities 660. In some embodiments, the threshold for determining that a potential defect in SEM defect map 640 is a new defect is if the probability that the defect is a known defect is less than 90%. In other embodiments, the threshold can be lower. In other embodiments, the threshold can be higher. The threshold can be adjusted to meet the needs of the manufacturing system.

Figure 7:
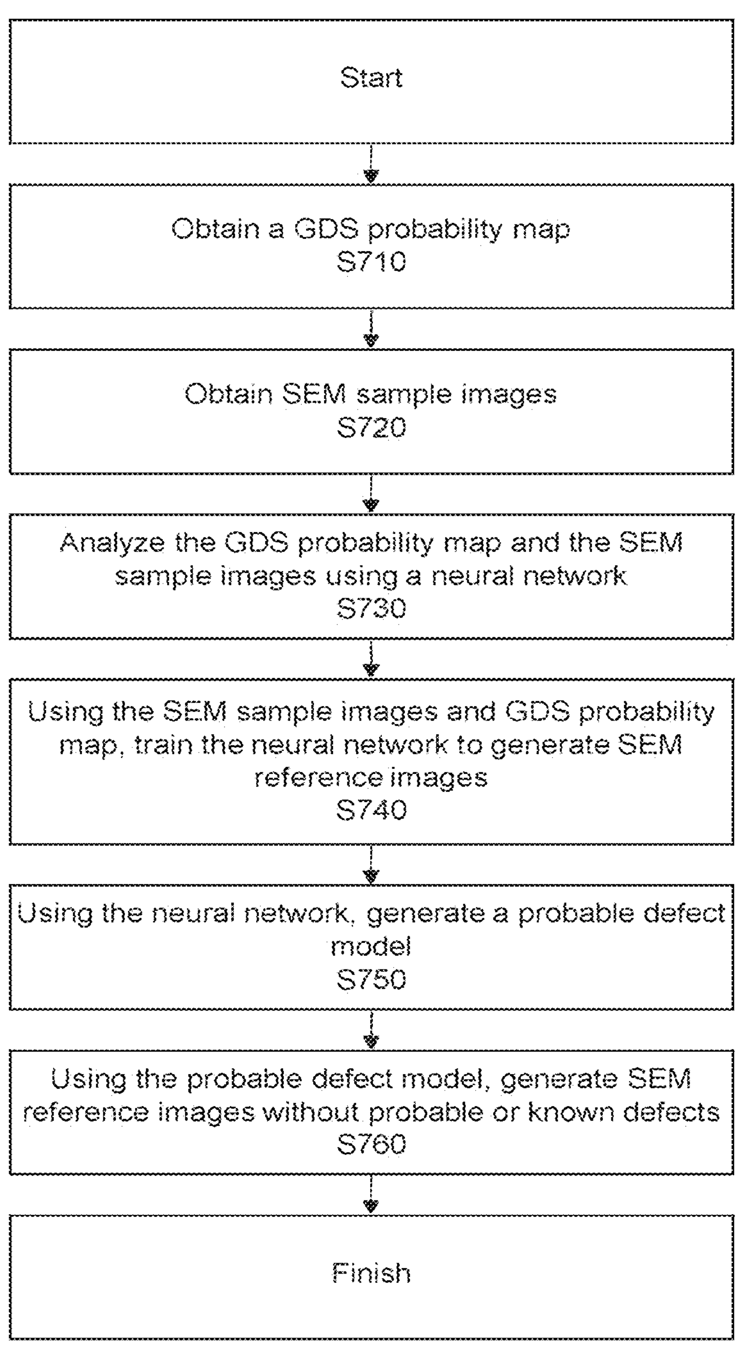
FIG. 7 is a process flowchart representing an exemplary method for training a model for defect classification, consistent with embodiments of the present disclosure.

FIG. 7 is a process flowchart representing an exemplary method 700 for training a model for defect classification, consistent with embodiments of the present disclosure. The steps of method 700 can be performed by a system (e.g., system 400 of FIG. 4) executing on or otherwise using the features of a computing device, e.g., controller 50 of FIG. 1 for purposes of illustration. It is appreciated that the illustrated method 700 can be altered to modify the order of steps and to include additional steps.

In step S710, the system can obtain a GDS probability map (e.g., GDS probability map 500 of FIG. 5). The GDS probability map can include regions (e.g., regions 510, 520, and 530) that represent the probability of known or expected types of defects (e.g., defects 300, 310, 320, 330, 340, and 350 of FIG. 3) occurring in those regions.

In step S720, the system can obtain SEM sample images (e.g., SEM sample images 420 of FIG. 4). The SEM sample images can have portions of the images that contain defects removed from the sample images. The removed regions can be interpolated or estimated by system 400. The SEM sample image can correspond to the GDS file used to generate the GDS probability map.

In step S730, the system can analyze the GDS probability map and SEM sample images using a neural network. In some embodiments, system 400 can be an ABCNN (e.g., ABCNN 430 of FIG. 4). Convoluted neural networks can be adapted to better process visual images than other types of neural networks or machine learning systems. System 400 can generate, using the ABCNN, the expected result for the missing portions of SEM sample images 420. The calculated regions of the sample images can be free from defects that might be present in the original SEM images and can represent the expected SEM image that would have been generated from a specific GDS layout (e.g., the GDS layout file used for the GDS probability map).

In step S740, the system can train the ABCNN (e.g., using supervised training 440 of FIG. 4). In some embodiments, training can be supervised. Under supervised learning, the removed portion of the sample image can be used as a ground truth reference for improving the accuracy of the training. In other embodiments training can be unsupervised. In yet other embodiments training can be semi-supervised. As system 400 processes additional SEM sample images, the results of training can be supplied to the ABCNN to improve its accuracy and functionality.

In step S750, after training, ABCNN can generate a probable defect model that can be used to generate portions of SEM images. The probable defect model can be used to replace portions of SEM sample images containing known defects to create an expected SEM image that would result from a GDS layout.

In step S760, using the probable defect model, the system can generate SEM sample images (e.g., SEM reference images 460) representing the expected SEM image for a GDS layout file (e.g., the GDS layout file used for GDS defect probability map 410 of FIG. 4 or GDS probability map 500 of FIG. 5).

Figure 8:
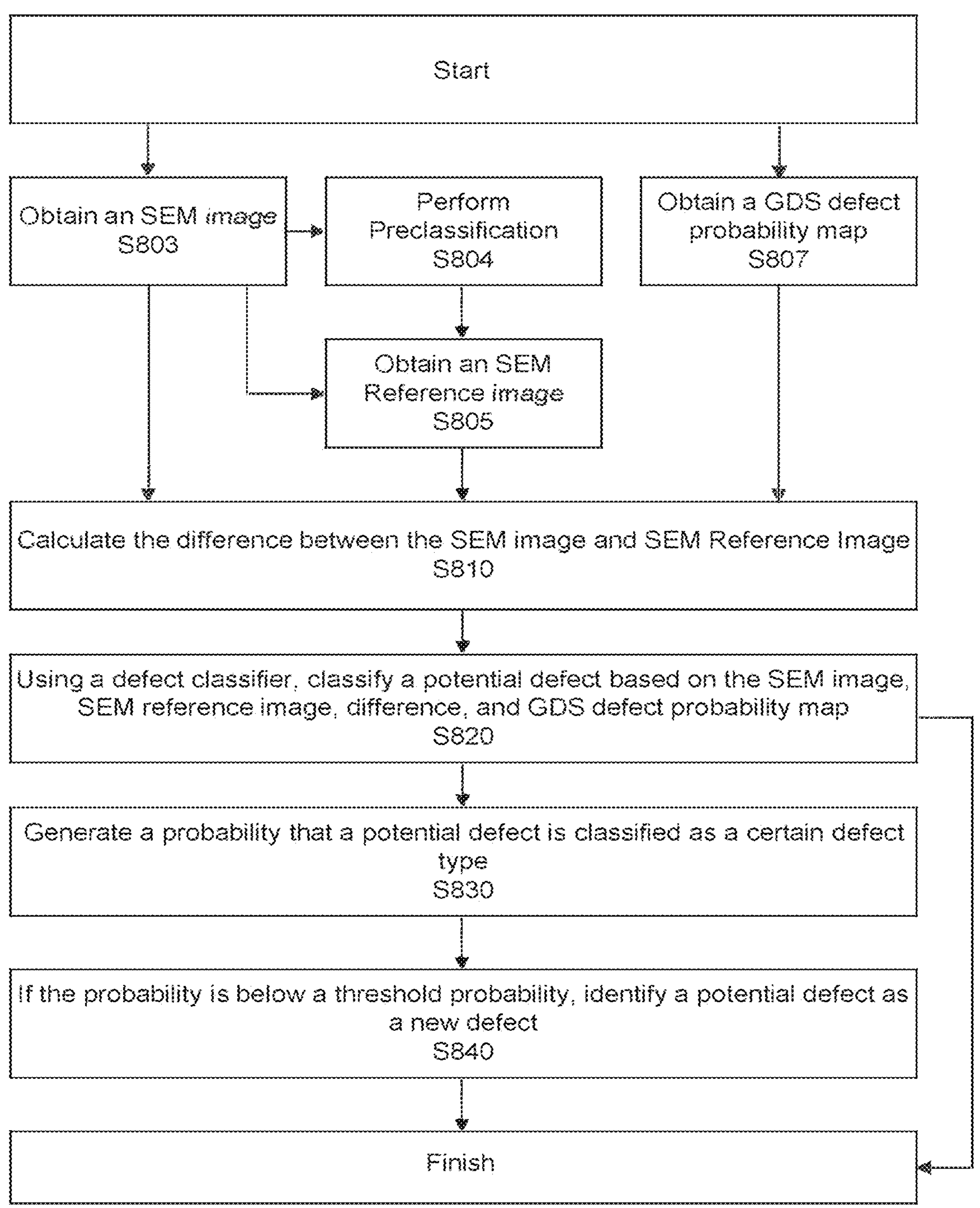
FIG. 8 is a process flowchart representing an exemplary method for defect classification, consistent with embodiments of the present disclosure.

FIG. 8 is a process flowchart representing an exemplary method 800 for a defect classification system, consistent with embodiments of the present disclosure. The steps of method 800 can be performed by a defect classification system (e.g., a defect classification system 600 of FIG. 6) executing on or otherwise using the features of a computing device, e.g., controller 50 of FIG. 1 for purposes of illustration. It is appreciated that the illustrated method 800 can be altered to modify the order of steps and to include additional steps.

In step S803, the system can obtain an SEM image (e.g., SEM image 620 of FIG. 6). The SEM image can be an image of a GDS layout captured (e.g., by inspection system 100 of FIG. 1) during manufacturing. The SEM image can correspond to specific GDS layout (e.g., the GDS layout used to generate GDS defect probability map 610 of FIG. 6).

In step S804, the system can perform pre-classification on an SEM image. In step S804, a potential defect(s) on an SEM image can be identified or categorized using existing defect identification or classification techniques. In some embodiments, a potential defect(s) can be identified by comparing an SEM image to reference data. In some embodiments, a potential defect(s) can be identified with a location of the potential defect(s) on the SEM image. In some embodiments, a defect type of the potential defect(s) can be classified as being a certain defect type by comparing the potential defect(s) to preidentified or known defects, for example, kept in a library.

In some embodiments, a potential defect(s) may not be identified or classified as a defect or as a certain defect type with sufficient confidence. In some embodiments, a confidence score for each potential defect can be generated. The confidence score may indicate a degree of confidence that an identified potential defect is a defect or that an identified potential defect is a certain defect type. In some embodiments, if the confidence score for a potential defect is lower than a threshold, it can be determined that the potential defect is not properly classified as a defect or as a certain defect type. In some embodiments, only an unknown defect(s) that is not classified as a defect or as a certain defect type with sufficient confidence may proceed to step S805, which will be described below. According to some embodiments, step S804 may be skipped.

In step S805, the system can obtain an SEM reference image (e.g., SEM reference image 630 of FIG. 6). The SEM reference image can be one of SEM reference images 460 of FIG. 4) output by a probable defect model (e.g., probable defect model 450 of FIG. 4). The SEM reference image can represent the expected SEM image of GDS layout.

In some embodiments where step S804 is performed, an SEM reference image can be generated by removing only a portion(s) (e.g., portion 555 in FIG. 5B) corresponding to an unknown defect(s) that is not classified as a defect or as a certain defect type with sufficient confidence in step S804. In some embodiments where step S804 is skipped, an SEM reference image can be generated by repeating a process of removing a portion (e.g., portion 555) and generating a pixel map (e.g., pixel map 570) for a whole frame of an SEM image. In these embodiments, because pre-classification by step S804 is not performed, potential defects or locations of potential defects are not identified yet. Therefore, a process of removing a portion (e.g., portion 555) and generating a pixel map (e.g., pixel map 570) can be repeated for a whole frame of SEM image 620 to identify a potential defect location(s) on an SEM image.

In step S807, the system can obtain a GDS probability map (e.g., GDS probability map 500 of FIG. 5 and GDS probability map 610 of FIG. 6). The GDS probability map can include regions (e.g., regions 510, 520, and 530) that represent the probability of known or expected types of defects (e.g., defects 300, 310, 320, 330, 340, and 350 of FIG. 3) occurring in those regions.

In step S810, the system can calculate the difference between the SEM reference image and the SEM image. By subtracting the SEM image from the SEM reference image, the system can generate an image or map that includes only the potential defects (e.g., the defect map 640 of FIG. 6). In some embodiments where step S804 is performed, the generated SEM defect map may show only an unknown defect(s) that is not classified as a defect or as a certain defect type with sufficient confidence in step S804.

In step S820, the system can classify a potential defect(s) represented on a SEM defect map as a certain defect type (e.g., using defect classifier 650 of FIG. 6) based on the SEM image, SEM reference image, defect map, and GDS probability map. The system can identify the defects in the defect map and compare those defect locations to the defect probability map. The system can determine the likelihood that a defect in the defect map is a type (e.g., defects 300, 310, 320, 330, 340, and 350 of FIG. 3) that is likely to occur in a specified region of the GDS layout file. In some embodiments, a potential defect(s) represented in a SEM defect map can be classified as a certain defect type based on a location of the potential defect(s) on a SEM defect map (i.e., a location on an SEM image) and a GDS probability map. According to some embodiments, even an unknown defect that is not classified as a defect or as a certain defect type with sufficient confidence in step S804 can be classified as a certain defect type based on a location of a potential defect on an SEM image and a GDS probability map 610. In some embodiments, the method may finish (i.e., step S850) after step S820, and steps S830 and S840 may be skipped.

In step S830, the system can generate a probability that the potential defect(s) in a SEM defect map is a certain defect type for a particular region on a GDS probability map. The system can generate a probability for each of the defects in the defect map. In step S840, the system can determine which of the defects are below a threshold probability that identifies the defect as a new defect. In this way, the system can identify new or unknown defects that occur during manufacturing allowing the defect to be corrected. In some embodiments, if the probability is above a certain threshold, the classification of step S820 that the potential defect in a SEM defect map is a certain defect type can be maintained.

A non-transitory computer readable medium may be provided that stores instructions for a processor of a controller (e.g., controller 50 of FIG. 1) or of a system (e.g., system 300 of FIG. 3) to carry out the steps of methods 700 and 800 including, among other things, image inspection, image acquisition, image transformation, image processing, image comparison, stage positioning, beam focusing, electric field adjustment, beam bending, condenser lens adjusting, activating charged-particle source, and beam deflecting. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

The embodiments may further be described using the following clauses:

1. A method of defect classification comprising:
   obtaining an inspection image;
   obtaining layout data associated with the image;
   obtaining a probability map derived from the layout data, wherein the probability map identifies a probability of a first type of defect occurring in a region of the layout data;
   identifying a defect in the inspection image occurring at a first location; and
   classifying the defect based on the probability map and the first location.
2. The method of clause 1 wherein classifying the defect further comprises:
   classifying the defect as the first type of defect when the first location corresponds to the region of the layout data.
3. The method of clause 2 wherein classifying the defect further comprises:
   determining the probability that the defect is above a threshold probability of being the first type of defect; and
   in response to a determination that the probability is below the threshold probability, classifying the defect as a new defect type.
4. The method of clause 1 wherein the first type of defect is one of a predetermined set of known defect types.
5. The method of clause 1 wherein the first type of defect is one of a hard bridge defect, a soft bridge defect, a hard break defect, a soft break defect, a line-end pullback defect, or a particle defect.
6. The method of clause 1 wherein identifying a defect in the inspection image occurring at a first location further comprises:
   identifying a potential defect on the inspection image based on reference data corresponding to the inspection image;
   determining whether the potential defect on the inspection image matches any one of a predetermined set of known defect types; and
   pre-classifying the potential defect as an unknown defect type when the potential defect does not match any one of the predetermined set of known defect types.
7. The method of clause 1 wherein identifying a defect in the inspection image occurring at a first location further comprises:
   identifying a potential defect on the inspection image based on reference data corresponding to the inspection image;
   determining that the potential defect on the inspection image matches a known defect type among a predetermined set of known defect types;
   determining a confidence score that the potential defect matches the known defect type; and
   pre-classifying the potential defect as an unknown defect type when the confidence score is below a threshold value.
8. A method of training a model, the method comprising:
   obtaining layout data;
   obtaining an inspection image;
   generating a partial inspection image by removing a first portion of the inspection image;
   obtaining a probability map derived from the layout data wherein the probability map identifies a probability of a first type of defect occurring in a region of the layout data; and
   training the model to generate an expected image corresponding to the first portion of the inspection image using the probability map, the first portion of the inspection image, and the partial inspection image.
9. The method of clause 8 wherein training the model further comprises:
   training the model to generate the expected image using the first portion as a ground truth reference.
10. The method of clause 9 wherein the model is an attention based convoluted neural network.
11. A method of generating a portion of an inspection image, the method comprising: obtaining layout data;
   generating a partial inspection image by removing a first portion of the inspection image;
   obtaining a model trained to generate portions of images;
   obtaining a probability map derived from the layout data, wherein the probability map identifies a probability of a first type of defect occurring in a region of the layout data; and
   generating a second portion of the inspection image, based on the partial inspection image, the probability map, and the model.
12. The method of clause 11 wherein the first portion of the inspection image corresponds to a central location of the inspection image.

13. The method of clause 12, further comprising:
comparing the first portion of the inspection image with the second portion of the inspection image; and
determining, based on the comparison, a defect at a first location of the inspection image.

14. The method of clause 13, further comprising:
classifying the defect based on the probability map and the first location.

15. The method of any one of clauses 11-14 wherein the second portion of the inspection image replaces the first portion of the inspection image in the inspection image.

16. The method of any one of clauses 1-15 wherein the inspection image is an SEM image.

17. The method of any one of clauses 1-16, wherein the layout data is in Graphic Database System (GDS) format, Graphic Database System II (GDS II) format, Open Artwork System Interchange Standard (OASIS) format, or Caltech Intermediate Format (CIF).

18. A system comprising:
a memory storing a set of instructions; and
at least one processor configured to execute the set of instructions to cause the system to perform:
obtaining an inspection image;
obtaining layout data associated with the image;
obtaining a probability map derived from the layout data wherein the probability map identifies a probability of a first type of defect occurring in a region of the layout data;
identifying a defect in the inspection image occurring at a first location; and
classifying the defect based on the probability map and the first location.

19. The system of clause 18 wherein, in classifying the defect, the at least one processor is configured to execute the set of instructions to further cause the system to perform:
classifying the defect as the first type of defect when the first location corresponds to the region of the layout data.

20. The system of clause 19 wherein, in classifying the defect, the at least one processor is configured to execute the set of instructions to further cause the system to perform:
determining the probability that the defect is above a threshold probability of being the first type of defect; and
in response to a determination that the probability is below the threshold probability, classifying the defect as a new defect type.

21. The system of clause 18 wherein the first type of defect is one of a predetermined set of known defect types.

22. The system of clause 18 wherein the first type of defect is one of a hard bridge defect, a soft bridge defect, a hard break defect, a soft break defect, a line-end pullback defect, or a particle defect.

23. The system of clause 18 wherein, in identifying a defect in the inspection image, the at least one processor is configured to execute the set of instructions to further cause the system to perform:
identifying a potential defect on the inspection image based on reference data corresponding to the inspection image;
determining whether the potential defect on the inspection image matches any one of a predetermined set of known defect types; and
pre-classifying the potential defect as an unknown defect type when the potential defect does not match any one of the predetermined set of known defect types.

24. The system of clause 18 wherein, identifying a defect in the inspection image, the at least one processor is configured to execute the set of instructions to further cause the system to perform:
identifying a potential defect on the inspection image based on reference data corresponding to the inspection image;
determining that the potential defect on the inspection image matches a known defect type among a predetermined set of known defect types;
determining a confidence score that the potential defect matches the known defect type; and
pre-classifying the potential defect as an unknown defect type when the confidence score is below a threshold value.

25. A system comprising:
a memory storing a set of instructions; and
at least one processor configured to execute the set of instructions to cause the system to perform:
obtaining layout data;
obtaining an inspection image;
generating a partial inspection image by removing a first portion of the inspection image;
obtaining a probability map derived from the layout data wherein the probability map identifies a probability of a first type of defect occurring in a region of the layout data; and
training the model to generate an expected image corresponding to the first portion of the inspection image using the probability map, the first portion of the inspection image, and the partial inspection image.

26. The system of clause 25 wherein, in training the model, the at least one processor is configured to execute the set of instructions to further cause the system to perform:
training the model to generate the expected image using the first portion as a ground truth reference.

27. The system of clause 25 wherein the model is an attention based convoluted neural network.

28. A system comprising:
a memory storing a set of instructions; and
at least one processor configured to execute the set of instructions to cause the system to perform:
generating a partial inspection image by removing a first portion of the inspection image;
obtaining a model trained to generate portions of images;
obtaining a probability map derived from the layout data wherein the probability map identifies a probability of a first type of defect occurring in a region of the layout data; and
generating a second portion of the inspection image, based on the partial inspection image, the probability map, and the model.

29. The system of clause 28 wherein the first portion of the inspection image corresponds to a central location of the inspection image.

30. The system of clause 29 wherein the at least one processor is configured to execute the set of instructions to further cause the system to perform:
comparing the first portion of the inspection image with the second portion of the inspection image; and determining, based on the comparison, a defect at a first location of the inspection image.

31. The system of clause 30 wherein the at least one processor is configured to execute the set of instructions to further cause the system to perform:

classifying the defect based on the probability map and the first location.

32. The system of any one of clauses 28-31 wherein the second portion of the inspection image replaces the first portion of the inspection image in the inspection image.

33. The system of any one of clauses 12-32 wherein the inspection image is an SEM image.

34. The system of any one of clauses 12-33, wherein the layout data is in Graphic Database System (GDS) format, Graphic Database System II (GDS II) format, Open Artwork System Interchange Standard (OASIS) format, or Caltech Intermediate Format (CIF).

35. A non-transitory computer readable medium that stores a set of instructions that is executable by at least one processor of a computing device to cause the computing device to perform a method of defect classification, the method comprising:

obtaining an inspection image;

obtaining layout data associated with the image;

obtaining a probability map derived from the layout data wherein the probability map identifies a probability of a first type of defect occurring in a region of the layout data;

identifying a defect in the inspection image occurring at a first location; and classifying the defect based on the probability map and the first location.

36. The non-transitory computer readable medium of clause 35 wherein, in classifying the defect, the set of instructions that is executable by at least one processor of the computing device to cause the computing device to further perform:

classifying the defect as the first type of defect when the first location corresponds to the region of the layout data.

37. The non-transitory computer readable medium of clause 36 wherein the set of instructions that is executable by at least one processor of the computing device to cause the computing device to further perform:

determining the probability that the defect is above a threshold probability of being the first type of defect; and in response to a determination that the probability is below the threshold probability, classifying the defect as a new defect type.

38. The non-transitory computer readable medium of clause 35 wherein the first type of defect is one of a predetermined set of known defect types.

39. The non-transitory computer readable medium of clause 35 wherein the first type of defect is one of a hard bridge defect, a soft bridge defect, a hard break defect, a soft break defect, a line-end pullback defect, or a particle defect.

40. The non-transitory computer readable medium of clause 35 wherein, in identifying a defect in the inspection image, the set of instructions that is executable by at least one processor of the computing device to cause the computing device to further perform:

identifying a potential defect on the inspection image based on reference data corresponding to the inspection image;

determining whether the potential defect on the inspection image matches any one of a predetermined set of known defect types; and pre-classifying the potential defect as an unknown defect type when the potential defect does not match any one of the predetermined set of known defect types.

41. The non-transitory computer readable medium of clause 35 wherein, in identifying a defect in the inspection image, the set of instructions that is executable by at least one processor of the computing device to cause the computing device to further perform:

identifying a potential defect on the inspection image based on reference data corresponding to the inspection image;

determining that the potential defect on the inspection image matches a known defect type among a predetermined set of known defect types;

determining a confidence score that the potential defect matches the known defect type; and pre-classifying the potential defect as an unknown defect type when the confidence score is below a threshold value.

42. A non-transitory computer readable medium that stores a set of instructions that is executable by at least one processor of a computing device to cause the computing device to perform a method of training a model, the method comprising:

obtaining layout data;

obtaining an inspection image;

generating a partial inspection image by removing a first portion of the inspection image;

obtaining a probability map derived from the layout data wherein the probability map identifies a probability of a first type of defect occurring in a region of the layout data; and training the model to generate an expected image corresponding to the first portion of the inspection image using the probability map, the first portion of the inspection image, and the partial inspection image.

43. The non-transitory computer readable medium of clause 42 wherein, in training the model, the set of instructions that is executable by at least one processor of the computing device to cause the computing device to further perform:

training the model to generate the expected image using the first portion as a ground truth reference.

44. The non-transitory computer readable medium of clause 42 wherein the model is an attention based convoluted neural network.

45. A non-transitory computer readable medium that stores a set of instructions that is executable by at least one processor of a computing device to cause the computing device to perform a method of applying a trained model, the method comprising:

generating a partial inspection image by removing a first portion of the inspection image;

obtaining a model trained to generate portions of images;

obtaining a probability map derived from the layout data wherein the probability map identifies a probability of a first type of defect occurring in a region of the layout data; and generating a second portion of the inspection image, based on the partial inspection image, the probability map, and the model.

46. The non-transitory computer readable medium of clause 45 wherein the first portion of the inspection image corresponds to a central location of the inspection image.
47. The non-transitory computer readable medium of clause 46 wherein the set of instructions that is executable by at least one processor of the computing device to cause the computing device to further perform:
    comparing the first portion of the inspection image with the second portion of the inspection image; and
    determining, based on the comparison, a defect at a first location of the inspection image.
48. The non-transitory computer readable medium of clause 47 wherein the set of instructions that is executable by at least one processor of the computing device to cause the computing device to further perform:
    classifying the defect based on the probability map and the first location.
49. The non-transitory computer readable medium of any one of clauses 45-48 wherein the second portion of the inspection image replaces the first portion of the inspection image in the inspection image.
50. The non-transitory computer readable medium of any one of clauses 35-49 wherein the inspection image is an SEM image.
51. The non-transitory computer readable medium of any one of clauses 35-50 wherein the layout data is in Graphic Database System (GDS) format, Graphic Database System II (GDS II) format, Open Artwork System Interchange Standard (OASIS) format, or Caltech Intermediate Format (CIF).

The block diagrams in the figures illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit. Blocks may also represent a module, a segment, or a portion of code that comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A system comprising:
a memory storing a set of instructions; and
at least one processor configured to execute the set of instructions to cause the system to perform:
obtaining an inspection image of a wafer resulting from a lithography manufacturing process;
obtaining layout data associated with the inspection image;
obtaining a probability map derived from the layout data wherein the probability map identifies a probability of a first type of defect resulting from the lithography manufacturing process occurring in a region of the layout data;
identifying a potential defect resulting from the lithography manufacturing process in the inspection image occurring at a first location;
evaluating a confidence score for the potential defect based on a threshold corresponding to a known defect type;
indicating the potential defect as an unknown defect type if the confidence score does not satisfy the threshold; and
classifying the unknown defect type based on the probability map and the first location.

2. The system of claim 1, wherein, in classifying the unknown defect type, the at least one processor is configured to execute the set of instructions to further cause the system to perform:
classifying the unknown defect type as the first type of defect when the first location corresponds to the region of the layout data.

3. The system of claim 2, wherein, in classifying the unknown defect type, the at least one processor is configured to execute the set of instructions to further cause the system to perform:
determining the probability that the unknown defect type is above a threshold probability of being the first type of defect; and
in response to a determination that the probability is below the threshold probability, classifying the unknown defect type as a new defect type.

4. The system of claim 1, wherein the first type of defect is one of a predetermined set of known defect types.

5. The system of claim 1, wherein the first type of defect is one of a hard bridge defect, a soft bridge defect, a hard break defect, a soft break defect, a line-end pullback defect, or a particle defect.

6. The system of claim 1, wherein, in evaluating the confidence score, the at least one processor is configured to execute the set of instructions to further cause the system to perform:
evaluating the confidence score based on a threshold corresponding to a known defect type among a predetermined set of known defect types.

7. The system of claim 1, wherein the layout data is in Graphic Database System (GDS) format, Graphic Database System II (GDS II) format, Open Artwork System Interchange Standard (OASIS) format, or Caltech Intermediate Format (CIF).

8. A non-transitory computer readable medium that stores a set of instructions that is executable by at least one processor of a computing device to cause the computing device to perform a method of defect classification, the method comprising:
obtaining an inspection image of a wafer resulting from a lithography manufacturing process;
obtaining layout data associated with the inspection image;

obtaining a probability map derived from the layout data wherein the probability map identifies a probability of a first type of defect resulting from the lithography manufacturing process occurring in a region of the layout data;

identifying a potential defect resulting from the lithography manufacturing process in the inspection image occurring at a first location;

evaluating a confidence score for the potential defect based on a threshold corresponding to a known defect type;

indicating the potential defect as an unknown defect type if the confidence score does not satisfy the threshold; and classifying the unknown defect type based on the probability map and the first location.

9. The non-transitory computer readable medium of claim 8, wherein, in classifying the unknown defect type, the set of instructions that is executable by at least one processor of the computing device to cause the computing device to further perform:

classifying the unknown defect type as the first type of defect when the first location corresponds to the region of the layout data.

10. The non-transitory computer readable medium of claim 9, wherein the set of instructions that is executable by at least one processor of the computing device to cause the computing device to further perform:

determining the probability that the unknown defect type is above a threshold probability of being the first type of defect; and in response to a determination that the probability is below the threshold probability, classifying the unknown defect type as a new defect type.

11. The non-transitory computer readable medium of claim 8, wherein the first type of defect is one of a predetermined set of known defect types.

12. The non-transitory computer readable medium of claim 8, wherein the first type of defect is one of a hard bridge defect, a soft bridge defect, a hard break defect, a soft break defect, a line-end pullback defect, or a particle defect.

13. The non-transitory computer readable medium of claim 8, wherein, in evaluating the confidence score, the set of instructions that is executable by at least one processor of the computing device to cause the computing device to further perform:

evaluating the confidence score based on a threshold corresponding to a known defect type among a predetermined set of known defect types.

14. A method of defect classification comprising:

obtaining an inspection image of a wafer resulting from a lithography manufacturing process;

obtaining layout data associated with the inspection image;

obtaining a probability map derived from the layout data, wherein the probability map identifies a probability of a first type of defect resulting from the lithography manufacturing process occurring in a region of the layout data;

identifying a potential defect resulting from the lithography manufacturing process in the inspection image occurring at a first location;

evaluating a confidence score for the potential defect based on a threshold corresponding to a known defect type;

indicating the potential defect as an unknown defect type if the confidence score does not satisfy the threshold; and classifying the unknown defect type based on the probability map and the first location.

15. The method of claim 14, wherein classifying the defect further comprises:

classifying the unknown defect type as the first type of defect when the first location corresponds to the region of the layout data.

16. The method of claim 15, wherein classifying the unknown defect type further comprises:

determining the probability that the unknown defect type is above a threshold probability of being the first type of defect; and in response to a determination that the probability is below the threshold probability, classifying the unknown defect type as a new defect type.

17. The method of claim 14, wherein the first type of defect is one of a predetermined set of known defect types.

18. The method of claim 14, wherein the first type of defect is one of a hard bridge defect, a soft bridge defect, a hard break defect, a soft break defect, a line-end pullback defect, or a particle defect.

* * * * *